Oct. 3, 1939.  L. W. PARDEE  2,175,065
HANDLE SWITCH
Filed Jan. 8, 1936
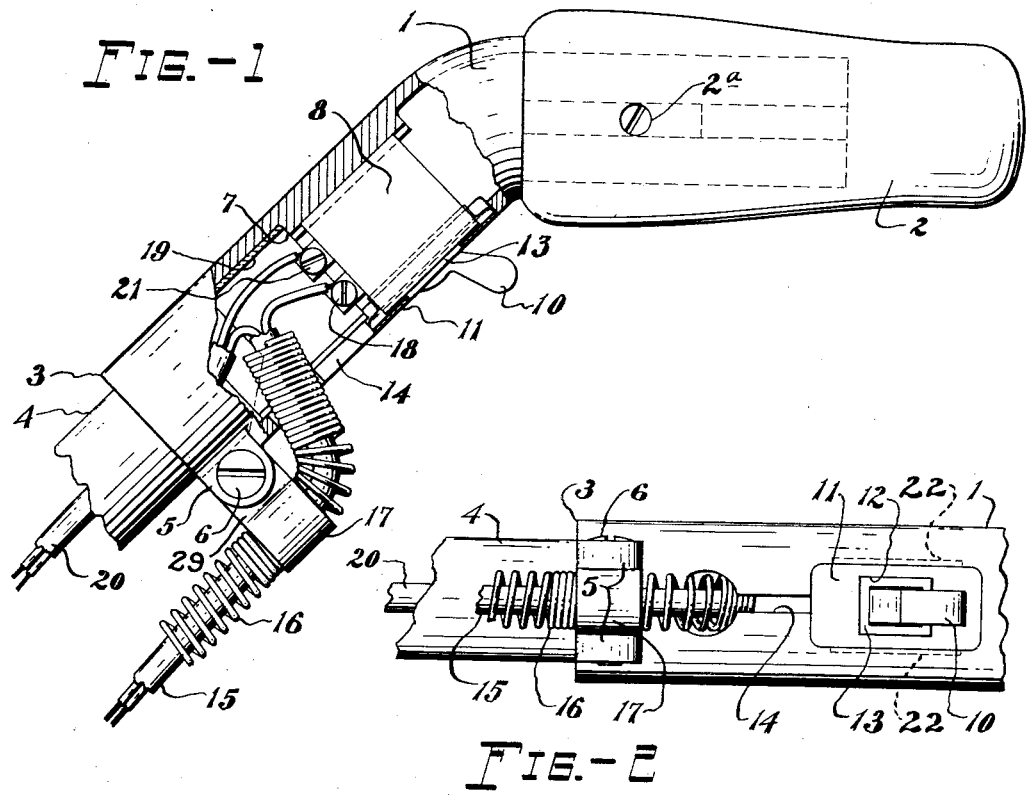
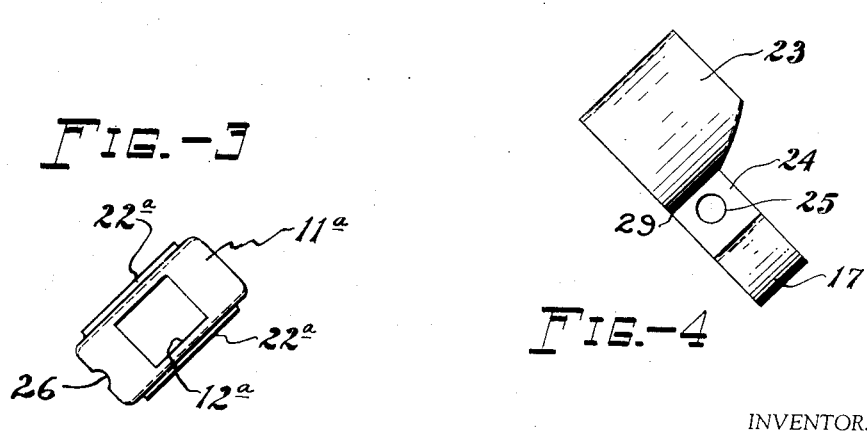
INVENTOR.
LLOYD W. PARDEE
BY Edmund J. Te Pas
his ATTORNEY.

Patented Oct. 3, 1939

2,175,065

UNITED STATES PATENT OFFICE 2,175,065

HANDLE SWITCH

Lloyd W. Pardee, Lakewood, Ohio, assignor to The Scott & Fetzer Company, Cleveland, Ohio, a corporation of Ohio Application January 8, 1936, Serial No. 58,099

2 Claims. (Cl. 200—157)

This invention relates to electric switches and in particular to switches adapted for use in connection with the handle of a manually controlled, electrically-operated device, as for example, a vacuum cleaner.

The present invention has for its object the provision of a simple and inexpensive arrangement for the mounting of the control switch and the electric cord of a manually controlled, electrically-operated device, as for example, a vacuum cleaner of the general type illustrated in U. S. Patent No. 1,266,424, issued to F. C. De Reamer, May 14, 1918.

Stated in general terms, the form of the invention disclosed herein comprises a switch assembly of unitary construction in combination with a handle member having an opening for receiving the switch after it has been attached to an electric cord, such handle also having provisions for locating and supporting the switch and for anchoring the cord to the handle. A spring plate, which frictionally engages the handle about the switch opening, is provided for holding the switch in place, the same being arranged to be sprung into place and maintained in such position without the aid or use of screws or other fastening members, the tension of the plate being utilized to cause certain of its edges to grip the handle and hold the switch in place.

In the figures of the drawing which show, by way of illustration, one mode of practicing the invention: Figure 1 is a side elevational view, partly in section, of a handle for a vacuum cleaner or similar devices, part of the handle being in section to illustrate the manner of mounting the switch and securing the electric cord to the handle; Figure 2 is a plan view of the underside of the handle and switch; Figure 3 is a plan view of a slightly modified form of switch retaining plate; and Figure 4 is a side elevational view of the member which is provided for retaining in place on the handle the wire spring which protects the extension cord at a point where it is attached to the handle.

The handle construction illustrated herein comprises an angularly bent part 1 of hollow or tubular construction which conveniently may be formed from a single die-casting or from a piece of tubing. The outer end of the handle part 1, when formed from a die-casting, is of reduced section and adapted for receiving a hand grip 2 which is secured to the part 1 by any suitable means, such as, a screw or bolt 2ª. The lower end 3 of the handle part 1 is adapted to be clamped to a tubular handle stick 4. The end 3 of the handle part 1 is provided with projecting ears 5 which are drilled and tapped to receive a screw 6 by means of which the part 1 is clamped to the tube 4. A channeled abutment or switch base 7 is integrally formed with the handle part 1 and it is adapted to engage one end of the box or housing of a switch 8 which has an operating member or trigger 10, adapted to project from the switch at the lower side of the handle part 1.

The switch is held in its operative position by means of a plate 11 which may be made from resilient material, as for example, steel or spring stock brass, so that its opposite edges may be sprung towards each other when it is snapped into place over the switch in the aperture of the handle part 1 which is provided for receiving the switch. The plate 11 is apertured at 12 for accommodation of an offset part 13 of the housing of the switch whereby the plate cooperates with the switch base 7 to hold the switch in a fixed and immovable position.

The handle part 1 is provided at its underside with a slot 14 which communicates with the opening for the switch and which extends to the lower end 3 of the handle part 1. The slot 14 is enlarged at one point for receiving an electric cord 15 and a coil spring 16 which protects this end of the cord against bending stresses. The spring is engaged by a sleeve element 17 of a supporting member 29 carried by the handle part 1.

One of the strands of the cord 15 is secured to the switch 8 by means of a screw 18 and the other strand of the cord 15 is connected to one of the strands of the cord 20. The other strand of the cord 20 is secured to the switch by means of a screw 21. An insulating member 19 is fitted inside the handle part 1 about the strands of the cord at the point of their attachment to the switch.

The supporting member 29 which is provided to hold the cord 15 and its protecting spring 16 on the handle, may be formed from a single piece of light gauge sheet metal which is bent over to form a sleeve 23 of a size so that it may be fitted in the handle part 1 over the end of the tube 4. The intermediate part 24 of this member is received between the ears 5 of the handle part 1 and it is provided with an aperture 25 for accommodation of the screw 6 and when this screw is tightened the member is securely held in place on the handle and at the same time the handle part 1 is caused to tightly grip the tubular member 4.

The plate 11 is provided with flanges 22 along two of its opposite edges and when the plate is sprung into position on the handle, the edges 22 will grip the handle part 1 about the opening which is provided for the insertion of the switch 8. In the modification of this plate, which is shown at Figure 3, parts corresponding to the parts of the plate shown in Figures 1 and 2, are indicated by corresponding numerals to which the subscript $a$ has been added.

In assembling the device, the cables 15 and 20 are first inserted into the handle part 1, with the strands thereof projecting from the opening provided in the handle part 1 for accommodation of the switch 8. The cord strands are then attached to the switch by means of the screws 18 and 21 and the switch inserted into place and the cover plate 11 snapped into position.

The assembly is completed by merely tightening the screw 6 which clamps the handle part 1 to its tube 4 and at the same time securely clamps the supporting member 29 including the cord spring holding sleeve 17 to the handle part 1. The switch may be readily removed by simply prying the plate 11 from the handle part 1, the slot 14 providing an opening for the insertion of a tool beneath the plate. The modified form of plate shown in Figure 3 is provided with a notched portion 26 for receiving a tool to effect its removal when the plate is used with a handle which does not have a slot such as 14.

The handle part 1 illustrated herein is preferably formed from a single die-casting. As previously indicated, a section of bent tubing may also be used for such purpose. A handle part of this sort is illustrated in the De Reamer patent previously mentioned. Where a piece of tubing is used, it is contemplated to have the box of the switch of such size so that it abuts against the wall of the tubing, in which case, the abutment 7 may be omitted.

Although one form of the invention has been described by way of illustration or example, it is to be clearly understood that the invention is not limited to this particular form. On the contrary, the invention includes each and every novel feature or combination of novel features herein disclosed and the right is reserved to add generic or specific claims to any such feature or combination of features during the prosecution of the application.

Having thus described my invention, what I claim is:

1. The combination with a handle having a hollow portion with an opening at one side thereof, of a switch insertable in the hollow portion of said handle by way of the opening in the side thereof, said switch having an operating member projecting therefrom, and a combined retainer and cover plate having offset portions adapted to engage respectively opposite portions of the handle adjacent to the switch-receiving opening thereof and to hold the switch against the surface of the interior portion of said handle opposite to the plate, the top of said plate when in place being flush with the outer surface of the hollow portion of said handle and forming substantially a continuation of the surface thereof.

2. The combination with a handle having a tubular wall with an opening therein, of a switch insertable in the handle by way of such opening, and a combined cover and switch retaining plate of cylindrical contour conforming to the handle and adapted to be received within said opening, the plate being made of resilient material and adapted to be temporarily flexed to decrease its width and permit its entry into the opening of said handle to engage the switch and urge the same against the portion of the interior of said handle opposite thereto, said interior portion of the handle being configurated for the accommodation of the side of the switch opposite to said plate and the side edges of said plate being bent over and adapted to engage the sides of the handle opening when the tension on the plate is released.

LLOYD W. PARDEE.